(12) United States Patent
Godas

(10) Patent No.: US 9,094,568 B1
(45) Date of Patent: Jul. 28, 2015

(54) AUTOMATIC DETECTION OF A CABLE TRAP

(71) Applicant: CSC Holdings, LLC, Bethpage, NY (US)

(72) Inventor: Eric Joseph Godas, Smithtown, NY (US)

(73) Assignee: CSC HOLDINGS, LLC, Bethpage, NY (US)

( * ) Notice: Subject to any disclaimer, the term of this patent is extended or adjusted under 35 U.S.C. 154(b) by 0 days.

(21) Appl. No.: 14/153,969

(22) Filed: Jan. 13, 2014

Related U.S. Application Data

(63) Continuation of application No. 13/679,918, filed on Nov. 16, 2012, now Pat. No. 8,640,157, which is a continuation of application No. 12/501,223, filed on Jul. 10, 2009, now Pat. No. 8,397,252.

(51) Int. Cl.
*H04N 7/16* (2011.01)
*H04N 7/10* (2006.01)
*H04N 21/61* (2011.01)

(52) U.S. Cl.
CPC ........... *H04N 7/102* (2013.01); *H04N 21/6118* (2013.01)

(58) Field of Classification Search
None
See application file for complete search history.

(56) References Cited

U.S. PATENT DOCUMENTS

| | | | | |
|---|---|---|---|---|
| 4,937,865 A * | 6/1990 | Barany | .................... | 380/242 |
| 5,581,555 A * | 12/1996 | Dubberly et al. | ............. | 370/487 |
| 6,067,440 A * | 5/2000 | Diefes | ............... | 725/27 |
| 6,952,729 B2 * | 10/2005 | Bialk et al. | .................... | 709/224 |
| 7,088,733 B1 * | 8/2006 | Rowe | ................... | 370/437 |
| 7,995,603 B2 * | 8/2011 | Revital et al. | ................. | 370/432 |
| 8,397,252 B2 | 3/2013 | Godas | | |
| 8,640,157 B2 | 1/2014 | Godas | | |
| 2003/0031180 A1 * | 2/2003 | Datta et al. | .................... | 370/392 |
| 2004/0172652 A1 * | 9/2004 | Fisk et al. | ...................... | 725/78 |
| 2005/0183130 A1 * | 8/2005 | Sadja et al. | .................. | 725/107 |
| 2005/0204397 A1 * | 9/2005 | Miyazoe et al. | ............. | 725/107 |
| 2006/0195862 A1 * | 8/2006 | Olcen | ............... | 725/22 |
| 2007/0294739 A1 * | 12/2007 | Walston | ........................ | 725/117 |
| 2009/0132862 A1 * | 5/2009 | Martin et al. | ................... | 714/45 |
| 2009/0222694 A1 * | 9/2009 | Adir et al. | ...................... | 714/26 |

\* cited by examiner

*Primary Examiner* — Brian T Pendleton
*Assistant Examiner* — Ryan Stronczer
(74) *Attorney, Agent, or Firm* — Sterne, Kessler, Goldstein & Fox P.L.L.C.

(57) ABSTRACT

Firmware is installed in a cable modem, enabling detection of the presence or absence of a cable trap in the feed of a customer location. Such a cable modem includes a trap-detection module and a trap-detection object. The trap-detection module is configured to determine whether a video signal is present at a cable-television frequency. The trap-detection object is configured to store data as to whether the video signal is present. For example, a first piece of data is stored if the video signal is present, indicating absence of a properly functioning cable trap between a cable head-end and the cable modem. A second piece of data is stored if the video signal is absent, indicating presence of a properly functioning cable trap between the cable head-end and the cable modem.

20 Claims, 6 Drawing Sheets

AUTOMATIC DETECTION OF A CABLE TRAP

CROSS REFERENCE TO RELATED APPLICATIONS

This application is a continuation of U.S. application Ser. No. 12/501,223, entitled "Automatic Detection of a Cable Trap" to Eric Joseph Godas and filed Jul. 10, 2009, now allowed, the entirety of which is incorporated by reference herein.

BACKGROUND OF THE INVENTION

1. Field of the Invention

The present invention is generally directed to cable television. More particularly, the present invention is directed to transmission and detection of video, voice, and data signals over a cable-television network.

2. Background Art

A cable modem is typically configured to concurrently receive several different types of signals over a single coaxial cable. For example, a cable modem may concurrently receive television signals, voice signals, and data signals. To enable a customer to concurrently access the information provided by the different signals, a customer system typically includes software and/or firmware modules specially designed to process the different signals. For example, a customer system may include one or more modules to process Internet protocol-based (IP-based) television signals, one or more modules to process voice signals, and one or more modules to process data signals. Alternatively, the cable modem may pass video-based television signals directly to a set-top box. In either case, a customer can typically watch television, talk on the telephone, and surf the Internet—all at the same time.

To prevent a customer from accessing cable-services content (e.g., premium channels) without proper authorization, cable-service providers have historically used cable traps. A cable trap is a type of filter. Specifically, cable traps are configured to block the transmission of one or more cable channels (e.g., frequencies). If a cable trap is properly installed at a location (e.g., a tap) between a cable head-end and a cable modem at the customer location, the delivery of one or more channels into the customer's cable modem is blocked, thereby preventing the customer from receiving services for which he has not paid. Although modern cable systems now often use digital set-top box technologies to control the delivery of service to customers, cable traps continue to be used for customers who subscribe to only basic cable or cable-modem services in order to block extended basic services.

Unfortunately, cable traps are a physical-security mechanism and, as such, are less secure than digital set-top box technologies. In particular, cable traps are subject to alteration, especially removal, in order to enable reception of unauthorized services. Due to this susceptibility, a typical cable company regularly audits its facilities to ensure that cable traps remain in place where they belong.

However, conventional cable-trap audits are problematic for several reasons. As an initial matter, these audits typically involve manual inspection—an expensive and time-consuming process. Moreover, these audits can be ineffective in certain situations (e.g., when advanced notice is required before inspection). Such situations may arise, for example, in the context of multi-dwelling unit (MDU) buildings. In MDU buildings, cable traps are usually located in a utility closet. Often, advanced notice must be given to the building's superintendent before accessing the utility closet. However, even if a cable trap had been removed and/or tampered with, the advanced notice provides the opportunity for the cable trap to be re-installed and/or replaced before the inspection occurs.

Given the foregoing, what is needed is automatic detection of cable traps and applications thereof.

BRIEF SUMMARY OF EMBODIMENTS OF THE INVENTION

The present invention meets the above-described needs by providing for automatic detection of cable traps and applications thereof.

For example, an embodiment of the present invention provides a computer-implemented method for automatic cable trap-presence validation. This method includes several steps. In a first step, a trap-detection object is created in a management information base of a cable modem. The trap-detection object is configured to maintain data corresponding to whether a properly functioning cable trap is present between a cable head-end and the cable modem. In a second step, the data from the trap-detection object is obtained to determine whether the properly functioning cable trap is present between the cable head-end and the cable modem.

Another embodiment provides a method, implemented in a cable modem, for automatic trap-presence validation. This method includes several steps. In a first step, it is determined whether a video signal is present at a cable-television frequency. In a second step, data as to whether the video signal is present is stored. For example, a first piece of data is stored if the video signal is present, indicating absence of a properly functioning cable trap between a cable head-end and the cable modem. In contrast, a second piece of data is stored if the video signal is absent, indicating presence of the properly functioning cable trap between the cable head-end and the cable modem.

A further embodiment provides a cable modem for automatic trap-presence validation. The cable modem includes a trap-detection module and a trap-detection object. The trap-detection module is configured to determine whether a video signal is present at a cable-television frequency. The trap-detection object is configured to store data as to whether the video signal is present. For example, a first piece of data is stored if the video signal is present, indicating absence of a properly functioning cable trap between a cable head-end and the cable modem. In contrast, a second piece of data is stored if the video signal is absent, indicating presence of the properly functioning cable trap between the cable head-end and the cable modem.

A still further embodiment of the present invention provides a tangible computer-readable medium having stored thereon computer-executable instructions that, if executed by a computing device, cause the computing device to perform a method for automatic trap-presence validation. The method includes several steps. In a first step, it is determined whether a video signal 6 present at a cable-television frequency. In a second step, data as to whether the video signal is present is stored. For example, a first piece of data is stored if the video signal is present, indicating absence of a properly functioning cable trap between a cable head-end and the cable modem. In contrast, a second piece of data is stored if the video signal is absent, indicating presence of the properly functioning cable trap between the cable head-end and the cable modem.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
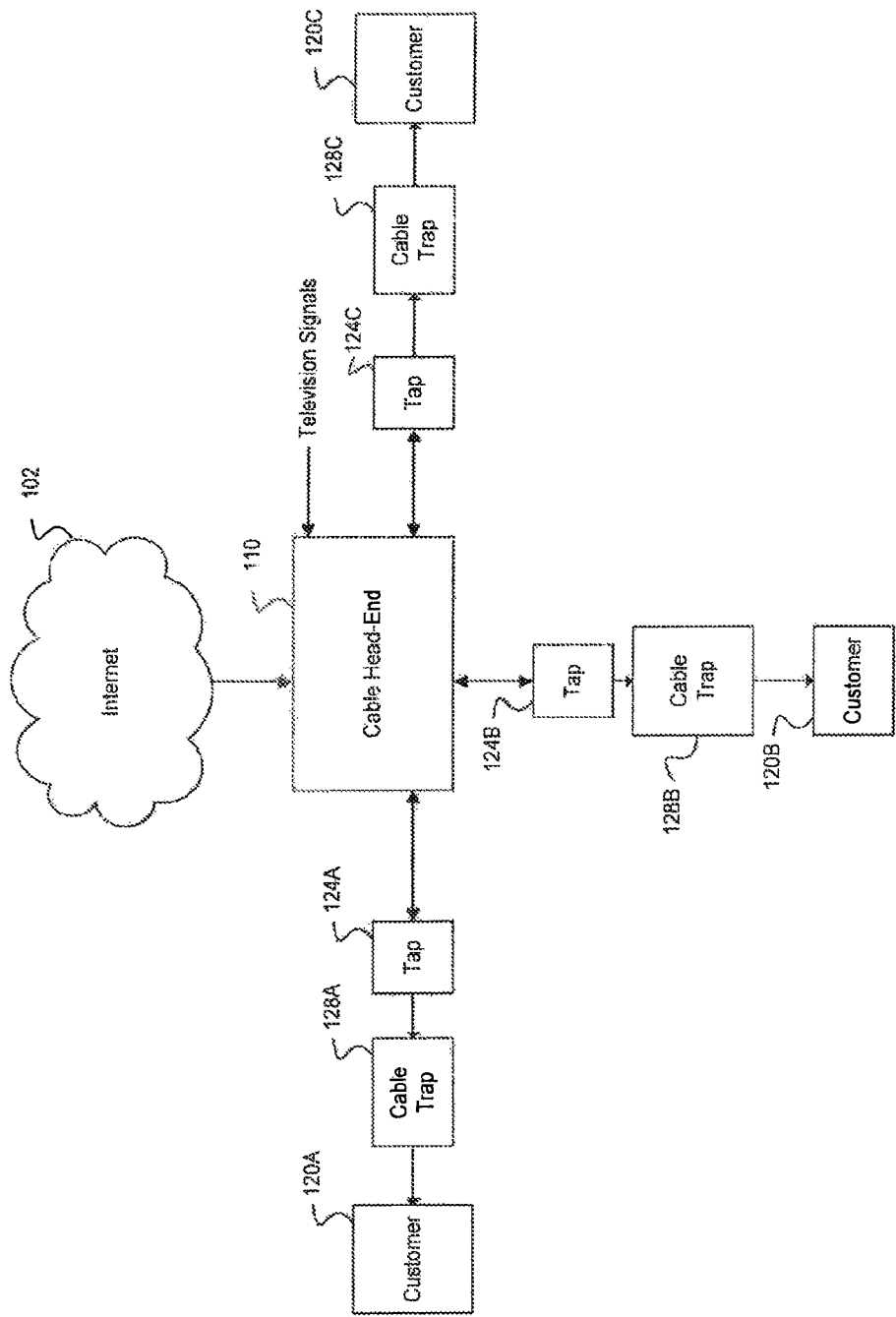
FIG. 1 illustrates an example system in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Overview

The present invention is directed to automatic detection of cable traps and applications thereof. Throughout this document, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In an embodiment, software (firmware) is installed on a cable modem, enabling it to detect and report the presence or absence of a cable trap in the feed to a customer location. Accordingly, embodiments of the present invention may enable a cable-services provider to determine whether cable traps are properly installed between a cable head-end and a customer location without an expensive, time-consuming, and potentially ineffectual manual inspection. Additionally or alternatively, embodiments of the present invention may enable a cable-services provider to identify one or more specific customer locations for manual inspection, rather than manually inspecting all customer locations within a geographic area.

A standard cable modem is capable of detecting digital video signals and energy associated with the carrier of the digital video signals. For example, a standard cable modem can detect the quadrature-amplitude-modulation (QAM) digital carriers typically used for digital video. A standard cable modem can also typically detect the presence of energy associated with NTSC or PAL video.

Embodiments of the present invention leverage one or more of these capabilities to detect and report the presence or absence of a cable trap based on the respective absence or presence of a signal on one or more channels within a trapped band. More specifically, the absence of a QAM digital carrier signal presumptively confirms the presence of a cable Pap. In contrast, the presence of a QAM digital carrier signal presumptively confirms the absence of a cable trap.

To detect the presence or absence of QAM digital carriers an embodiment of the present invention provides a trap-detection module. The trap-detection module is configured to cause a cable modem to listen to information on cable-television frequencies (e.g., channels), enabling the trap-detection module to detect whether QAM digital signals are present at a particular frequency or set of frequencies. As set forth above, detection of such signals corresponds to the absence of a cable trap and vice versa. The trap-detection module can then report this information to a cable head-end via a network protocol (such as, for example, a Simple Network Management Protocol (SNMP)).

Unfortunately, listening to cable-television frequencies (e.g., channels) potentially disrupts the reception of telephone and data signals, thereby potentially disrupting a customer's telephone calls and access to the Internet. Accordingly, in embodiments the trap-detection module performs steps to mitigate the potential interruptions to voice and data services. For example, in an embodiment the trap-detection module waits until an attached phone is on the hook (e.g., no call is in progress) before entering a trap-detection process. Similarly, in another embodiment the trap-detection module waits until after a cable-modem ranging process has completed before entering a trap-detection process, so that the trap-detection process can be completed without knocking the cable modem offline (which would require it to re-register). In a further embodiment, the trap-detection module identifies whether an active data connection is in progress and waits until the activity subsides before entering a trap-detection process. In a still further embodiment, if a trap-detection process is already in progress, the trap-detection module stalls this process if an attached phone goes off hook or if a new data connection is initiated, thereby re-establishing full voice and data connectivity.

During the trap-detection process, the trap-detection module causes the cable modem to tune to one or more specified cable-television frequencies (e.g., channels) and attempts to detect power and/or obtain QAM lock. In an embodiment, if QAM lock is obtained, the trap-detection module attempts to verify the presence of specific data on the channel (such as, for example, a target packet identification (PID)) to confirm that the signal originates from the cable head-end.

The results of the trap-detection process are stored in local memory (such as, for example, in Management Information Base (MIB) variables) to support subsequent polling from the cable head-end. To poll the results, the cable head-end may, for example, make use of a SNMP trap. As is well known by persons skilled in the relevant art(s), SNMP traps are substantially different than cable traps. A SNMP trap is used to transfer information via SNMP. In contrast, a cable trap is a type of filter.

The trap-detection module may be instructed by the cable head-end to enter the trap-detection process in order to poll a specific modem or modems. Alternatively, the trap-detection module may be preprogrammed to automatically enter the trap-detection process at regularly scheduled intervals to produce an exception report, identifying locations that appear to be engaged in receiving unauthorized services.

As set forth above, the trap-detection module may detect the presence or absence of traps. Detecting the presence of a trap might indicate unauthorized reception of service in, for example, a set-top box that is improperly moved from one location to another.

Responses to identified exceptions may be included in a manual audit and/or direct-customer communication/follow up. Also, service to a particular customer location may be disabled. In addition, automatically identified exception cases could be used to automatically target indirect messaging (e.g., web page redirects, targeted advertisement insertion within web pages, targeted television advertisements on set-top boxes, and the like). The content of the indirect messaging may, for example, encourage a customer to (legally) upgrade her service.

Before describing additional details of trap-detection modules and processes of embodiments of the present invention, it is helpful to describe an example system in which these modules and processes may be implemented.

II. An Example System

FIG. 1 is a block diagram of an example cable-services system, which may be used to automatically determine whether a cable trap is properly installed (e.g., present and working properly) in accordance with an embodiment of the present invention. Referring to FIG. 1, this system includes a cable head-end 110, which is coupled to a plurality of customers 120A-C. Cable head-end 110 is also coupled to the Internet 102 and cable networks, enabling cable head-end 110 to provide cable services (e.g., voice, data, and television services) to customers 120.

Taps 124A-C are located between cable head-end 110 and customers 120A-C, respectively. Taps 124 may be located, for example, on a telephone poll outside a single-family residence or in a utility closet of a MDU building. Taps 124 are used to allow a cable-services provider to monitor a cable signal as it travels from cable head-end 110 to customers 120. Coupled between each tap 124 and each customer 120 is a cable trap 128. Each cable trap 128 is configured to control the cable-television service provided to customers 120. For example, each cable trap 128 may be configured to provide a filtering function for (e.g., block) certain channels. In this way, cable traps 128 enable a cable-services provider to prevent customers 120 from receiving cable service for which they have not paid, but only if cable traps 128 are properly installed (e.g., present and working according to specifications).

Unfortunately, cable traps 128 may be altered, destroyed, and/or removed, causing them to fail to properly control the cable-services content provided to customers 120. In conventional methods, a cable-services provider manually inspects taps 124 to determine whether cable traps 128 are functioning properly.

In accordance with an embodiment of the present invention, a cable modem at each customer 120 includes a trap-detection module that enables the cable-services provider to remotely determine from cable head-end 110 whether cable traps 128 are properly installed, which may eliminate the need for a manual inspection or may identify specific cable traps 128 for manual inspection. To describe how the trap-detection module functions in this manner, it is first helpful to describe example components that may be included at the location of one or more customers 120.

III. Example User-End Components

Figure 2:
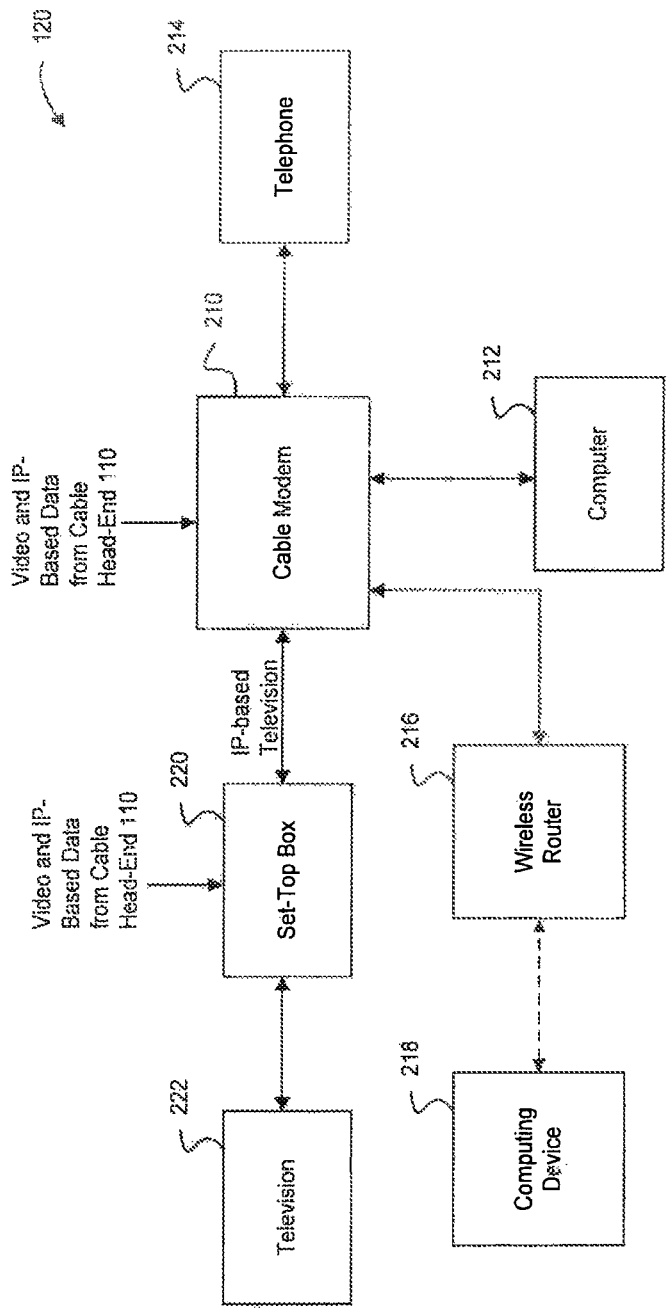
FIG. 2 is a block diagram of example components included on a user end.

FIG. 2 is a block diagram, illustrating example components at the location of customer 120. These components include a cable modem 210, a computer 212, a wireless router 216, a computing device 218, a telephone 214, a set-top box 220, and a television 222. Cable modem 210 receives a feed from cable head-end 110. Although the feed from cable head-end 110 may include data signals, voice signals, and television signals, cable modem 210 typically receives this feed through a single coaxial cable. Cable modem 210 may receive these signals over a single coaxial cable because these signals are allocated to different frequency bands.

Figure 3:
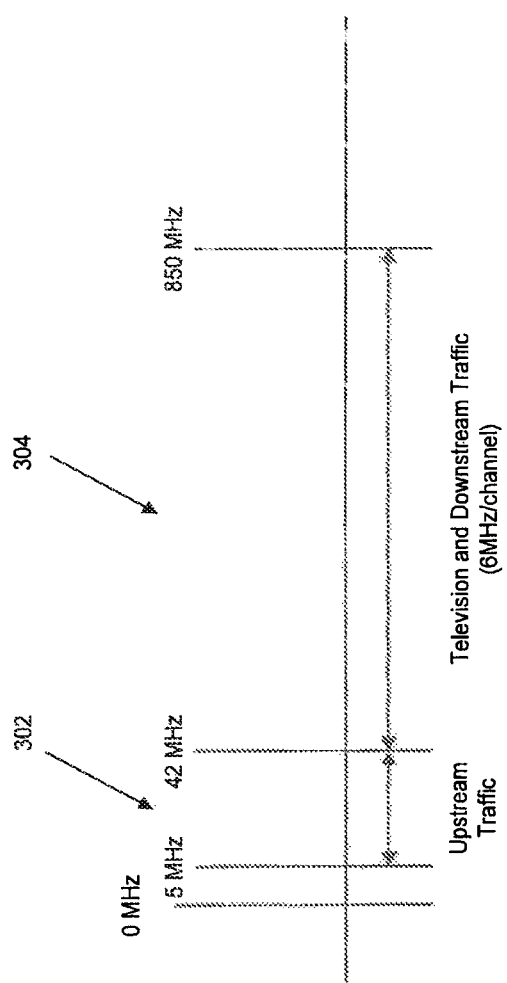
FIG. 3 illustrates an allocation of an available spectrum as used for cable-television services, voice services, and data services.

For example, FIG. 3 illustrates a spectrum of frequencies typically used in cable-services networks. The spectrum of frequencies may range from approximately 5 megahertz (MHz) to approximately 1,000 MHz. As illustrated in FIG. 3, this spectrum is broken up into two different frequency ranges—a first frequency range 302 and a second frequency range 304. Television signals are allocated to second frequency range 304, wherein each television signal is allocated to a different frequency band (e.g., a different 6-MHz channel) within second frequency range 304. Like the television signals, downstream telephone and data signals—i.e., information flowing from the Internet 102 to customer 120 via cable head-end 110—are also allocated to respective frequency bands (e.g., 6-MHz channels) within the second frequency range 304. Upstream telephone and data signals—i.e., information flowing from customer 120 to the Internet 102 via cable head-end 110—are typically allocated to respective frequency bands (e.g., 1.6-MHz channels, 3.2-MHz channels, or 6.4-MHz channels) within the first frequency range 302. Both voice and data signals are included in packets, using different types of packet-switching technology. In particular, voice signals are transmitted and received using voice-over-Internet protocol (VoIP) technology, and data signals are transmitted and received using standard Internet protocol technology.

As illustrated in FIG. 2, video signals may be provided directly to set-top box 220, which processes the video signals and provides them to television 222. Cable modem 210 is configured to provide IP-based signals (e.g., IP-based television signals, voice data, and Internet data) to the different components at the location of customer 120. For example, cable modem 210 provides: (i) IP-based television signals to television 222 directly or via set-top box 220; (ii) voice data to telephone 214; and (iii) Internet data to computer 212 and computing device 218 via wireless router 216.

In the embodiment of FIG. 2, cable modem 210 is illustrated as providing the respective signals directly to the various other components. This is for illustrative purposes only, and not limitation. In other embodiments, cable modem 210 may provide one or more signals to a secondary component before being received by the various other components illustrated in FIG. 2. For example, cable modem 210 may simply forward video-based television signals to set-top box 220, which may process these signals before providing them to television 222. Alternatively, cable modem 210 may process IP-based television signals and provide them directly to television 222, thereby bypassing set-top box 220. As another example, cable modem 210 may provide voice data to a telephone adaptor, which may further process these data before providing them to telephone 214.

Furthermore, cable modem 210 is illustrated as external to computer 212 and set-top box 220. This is also for illustrative purposes only, and not limitation. In embodiments, cable modem 210 may be included in other components included at the location of customer 120. For example cable modem 210 may be included in a computer (such as, computer 212) and/or a set-top box (such as, set-top box 220).

IV. Example Cable Modem

To receive and process the plurality of signals provided by cable head-end 110, cable modem 210 includes a plurality of hardware and software (firmware) components. Example hardware components and example software components of cable modem 210 are described below.

A. Example Hardware Components

Figure 4:
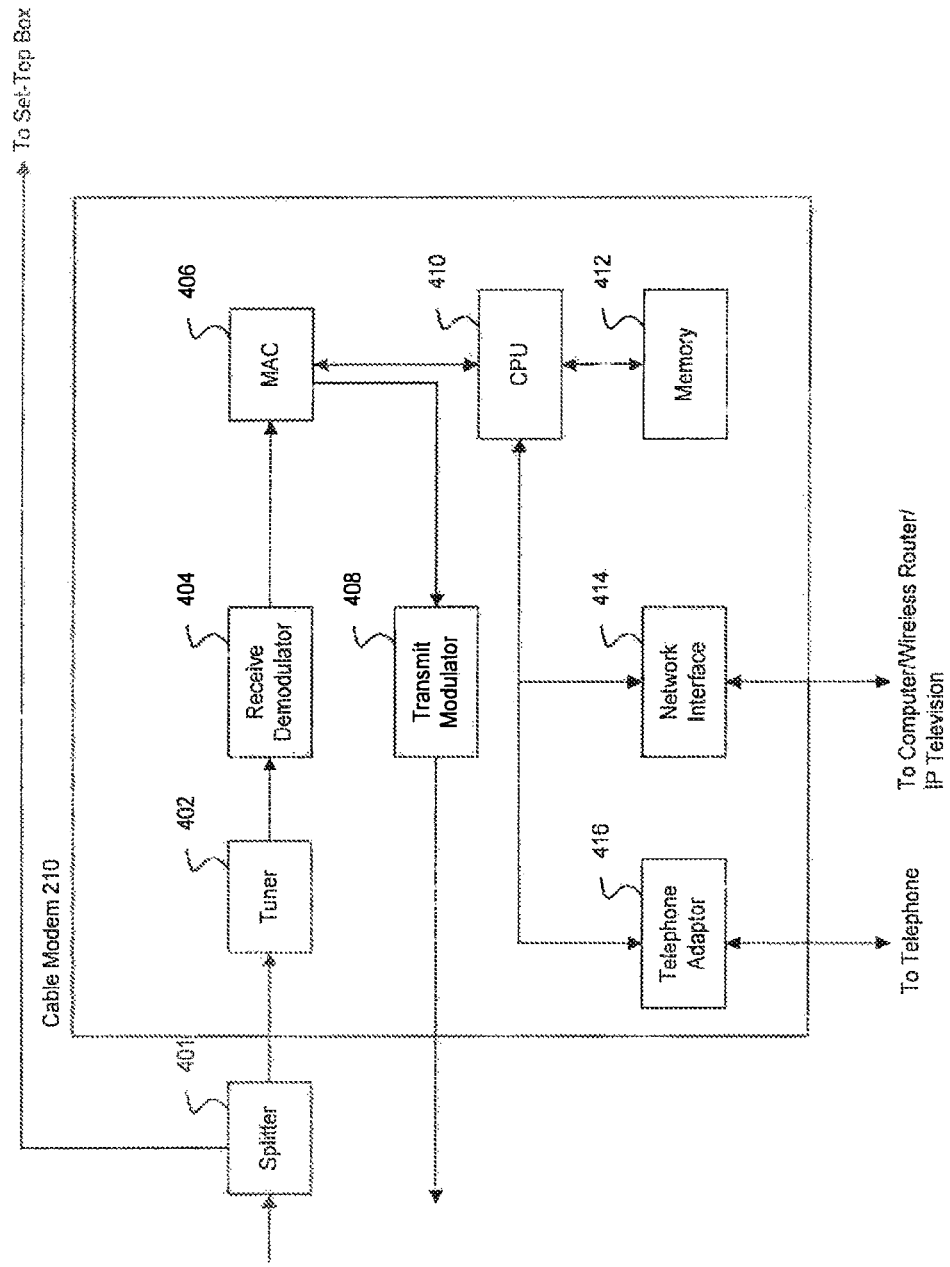
FIG. 4 is a block diagram of example hardware components of a cable modem in accordance with embodiments of the present invention.

FIG. 4 is a block diagram of example hardware components of cable modem 210. In the embodiment of FIG. 4, cable modem 210 includes a tuner 402, a receive demodulator 404, a media access control (MAC) device 406, a transmit modulator 408, a central-processing unit (CPU) 410, a memory 412, a network interface 414, and a telephone adaptor 416. Each of these components is described below.

A splitter 401, external to cable modem 210, may split the received signals into IP-based signals (e.g., voice, data, and IP-based television) and video-based television signals. The IP-based signals are provided to tuner 402 and are further processed by cable modem 210, as described in more detail below. The video-based television signals are provided to a set-top box (e.g., set-top box 220) for further processing before being sent to a television for viewing.

Tuner 402 tunes cable modem 210 to different frequency bands provided from cable head-end 110. For example, tuner 402 may include a diplexer to allow it to use one range of frequencies (e.g., approximately 5 MHz to approximately 42 MHz) for upstream traffic and another range of frequencies (e.g., approximately 42 MHz to approximately 850 MHz) for downstream traffic. Tuner 402 passes signals to receive demodulator 404.

Receive demodulator 404 demodulates radio-frequency signals provided from cable head-end 110 into digital computer-network data. For example, the received radio-frequency signals may be encoded using QAM, which is based on variations of both the amplitude and phase of a radio-frequency signal. In this example, receive demodulator 404 converts these QAM signals into simple signals for conversion into digital binary by an analog-to-digital (A/D) converter. The digital binary data is provided to MAC device 406.

MAC device 406 acts as an interface between the hardware and software components of cable modem 210. In particular, MAC device 406 assigns an identifier (i.e., a MAC address) to each component within a network, enabling software modules to uniquely identify the different components in the network. MAC device 406 is positioned between receive demodulator 404 and transmit modulator 408.

Transmit modulator 408 converts the digital computer-network data into radio-frequency signals for upstream transmission to cable head-end 110. Transmit modulator 408 typically includes an earn-correction section, a QAM modulator, and a digital-to-analog (D/A) converter.

CPU 410 runs software (firmware) modules that are executed on cable modem 210. For example, CPU 410 is configured to run modules that enable cable modem 210 to process IP-based television, voice, and data signals. In addition, CPU 410 is configured to run a trap-detection module of an embodiment of the present invention, as explained in greater detail below. CPU 410 may write data (such as, MIB variables) to memory 412 (such as, for example, a flash memory) or may immediately send a message (e.g., an SNMP trap) to the cable head-end 110 (e.g., a Network Operation Center (NOC)). Based on the processing provided by the modules running on CPU 410, IP-based television data can be provided to television 222, Internet data is provided to network interface 414, and voice data is provided to telephone adaptor 416.

Network interface 414 allows cable modem 210 to communicate with computer 212 and computing device 218 over a computer network. Similarly, telephone adaptor 416 converts digital voice data processed by CPU 410 into a format used by a conventional telephone.

B. Example Software Components

In addition to processing IP-based television, voice, and data signals, cable modem 210 is configured to determine whether cable trap 128 is properly installed between the location of customer 120 and cable head-end 110 in accordance with an embodiment of the present invention. To perform these functions, cable modem 210 includes a plurality of different software (firmware) modules.

Figure 5:
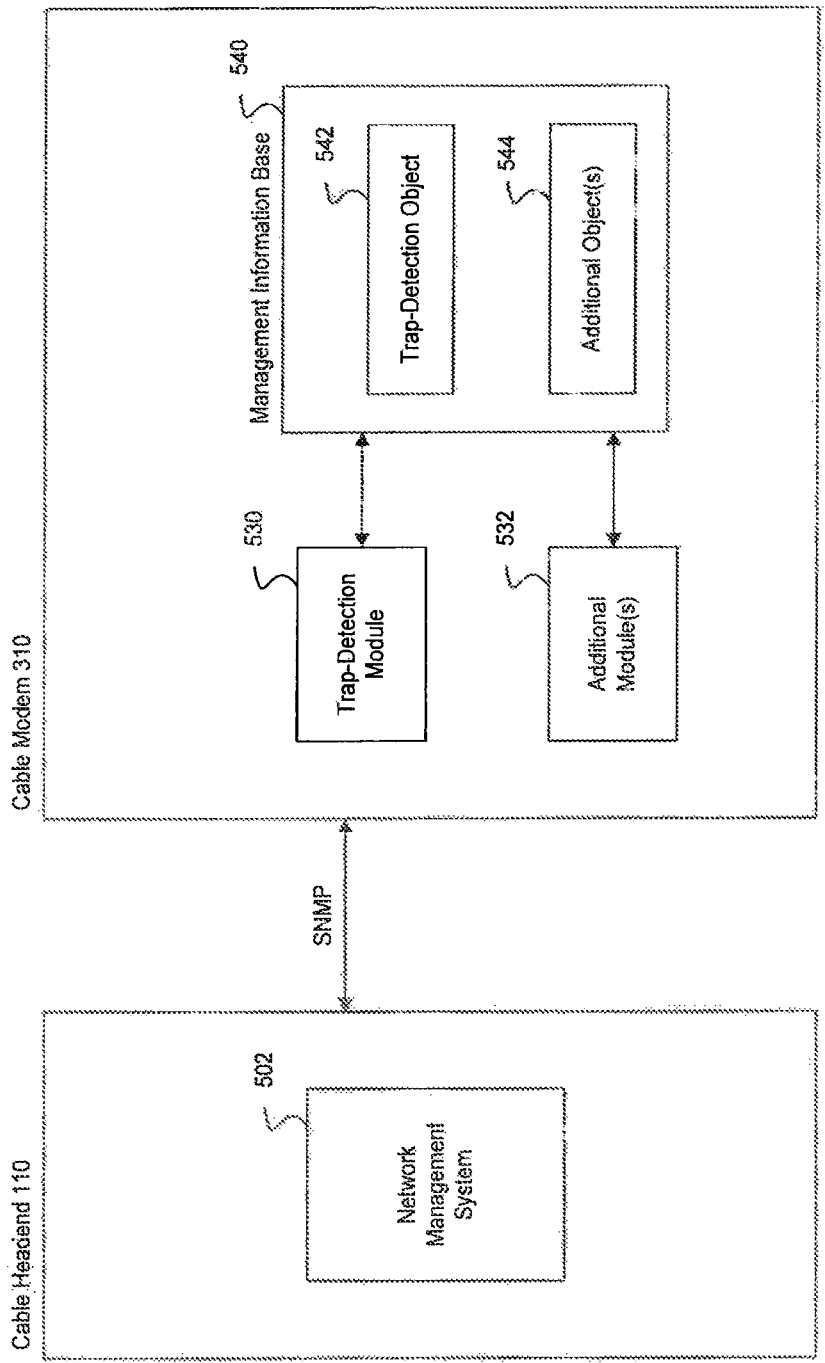
FIG. 5 is a block diagram of example software components of a cable modem in accordance with an embodiment of the present invention.

For example, FIG. 5 is a block diagram of example software (firmware) components of cable modem 210, including a trap-detection module 530 in accordance with an embodiment of the present invention and one or more additional modules 532. Trap-detection module 530 and the one or more additional modules 532 are managed by a network management system 502. These modules have access to information stored in objects of MIB 540 and translate this information to network management system 502 via a dedicated data channel or set of data channels. For example, trap-detection module 530 has access to trap-detection object 542, and the one or more additional modules 532 have access to one or more additional objects 544. The one or more additional modules 532 and trap-detection module 530 are described in greater detail below.

The one or more additional modules 532 enable cable modem 210 to receive and process IP-based television, voice, and/or data signals from cable head-end 110. To properly transmit and receive IP-based television, voice, and/or data signals from cable head-end 110, cable modem 210 establishes an appropriate connection with cable head-end 110. Establishing a connection may take several minutes and involves several steps. One of the first steps in establishing this connection is a ranging process. During the ranging process, a distance between cable modem 210 and cable head-end 110 is determined. This distance is used to ensure that the signals traveling between cable modem 210 and cable head-end 110 have sufficient power to be properly received at the respective locations. Even after a connection is properly established, cable head-end 110 periodically sends station-maintenance signals to ensure that the connection between cable head-end 110 and cable modem 210 is maintained. If cable modem 210 does not acknowledge and response to a station-maintenance signal after a predetermined time period (e.g., approximately 35 seconds), then one of the additional modules 532 causes cable modem 210 to re-initiate the connection with cable head-end 110. Re-initiating the connection may take several minutes and may disrupt voice and/or data services. In other words, a customer's telephone call or Internet experience may be disrupted if the connection between cable head-end 110 and cable modem 210 needs to be restarted from scratch (i.e., re-initialized).

Trap-detection module 530 is configured to determine whether one or more cable traps are properly installed between cable modem 210 and cable head-end 110. In particular, trap-detection module 530 is configured to temporarily disrupt cable modem from listening to the dedicated frequency between cable modem 210 and cable head-end 110 and to temporarily listen to a particular cable-television frequency band (e.g., channel) to determine whether a television signal is present at that frequency band.

The time period that trap-detection module 530 listens to the cable-television frequency is relatively short (e.g., approximately one second or less) for at least two reasons. First, listening to the cable-television frequency may disrupt voice and/or data signals being transmitted between cable modem 210 and cable head-end 110. Second, listening to the cable-television frequency may cause cable modem 210 to lose the connection with cable head-end 110, requiring the connection to be restarted which may disrupt voice and/or data signals (as set forth above). In embodiments of the present invention, trap-detection module 530 performs steps to mitigate these potential disruptions to voice and data services, as explained in greater detail below.

To detect a television signal at a particular frequency band (e.g., channel) being tested, trap-detection module 530 may, for example, attempt to lock onto a QAM signal and/or may attempt to detect energy associated with a carrier of the QAM signal. If, on the one hand, a television signal is present, this indicates that a cable trap is not properly installed to block transmission of the television signal at the particular frequency band (e.g., channel) being tested. If, on the other hand, a television signal is not present, this indicates that a cable trap is properly installed to block transmission of the television signal at the particular frequency band (e.g., channel) being tested.

Trap-detection module 530 may store this information about the presence or absence of a cable trap in a trap-detection object 542 of MIB 540. For example, trap-detection object 542 is configured to store a first piece of data (e.g., a logical 1) if trap-detection module 530 determines that a television signal is present at a particular frequency band, indicating that a cable trap is not properly installed to block that frequency band. If, on the other hand, trap-detection module 530 determines that a television signal is not present at a particular frequency band, then trap-detection object is configured to store a second piece of data (e.g., a logical 0), indicating that a cable trap is properly installed to block that frequency band.

Trap-detection module 530 is configured to transmit the information stored in trap-detection object 542 to network management system 502 using a network protocol. For example, this information may be transmitted to network management system 502 via a SNMP trap.

Network management system 502 may enable cable modem 210 to detect the presence or absence of a cable trap. For example, network management system 502 may create trap-detection object 542 within a MIB 540 of cable modem 210, and may install trap-detection module 530 on cable modem 210.

V. Example Operation

Figure 6:
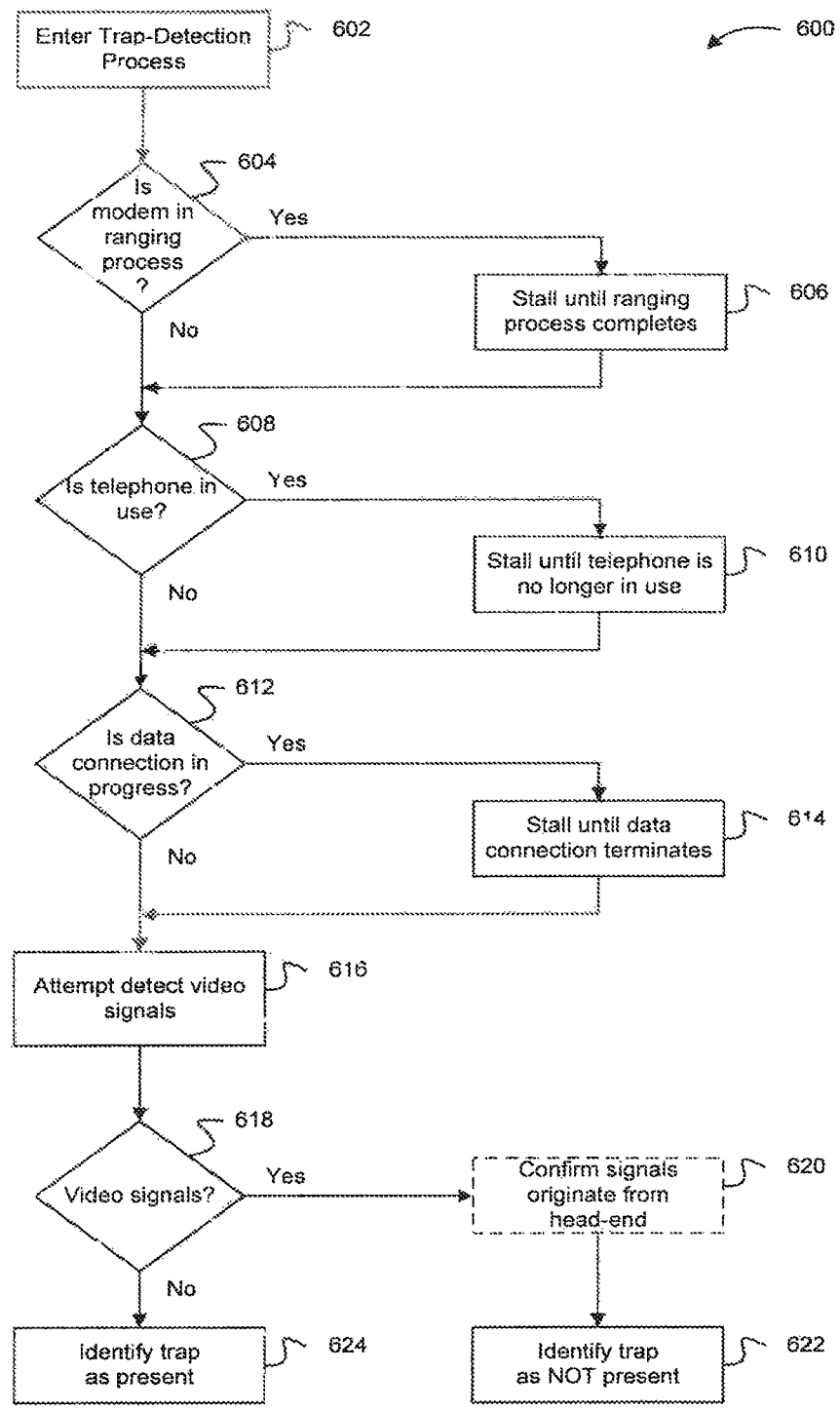
FIG. 6 is a block diagram of an example method for trap-presence validation in accordance with an embodiment of the present invention.

FIG. 6 is a block diagram of an example method 600 for trap-presence validation in accordance with an embodiment of the present invention. Method 600 begins at a step 602 in which a trap-detection process is initiated. In an embodiment, trap-detection module 530 enters the trap-detection process in response to a polling command from network management system 502. In another embodiment, trap-detection module 530 is programmed to periodically enter the trap-detection process. For example, trap-detection module 530 may be programmed to enter the trap-detection process once a week, once a month, once a quarter, or some other time period.

In a step 604, it is determined whether cable modem 210 is in a ranging process. If cable modem 210 is in a ranging process, the trap-detection process is stalled until the ranging process completes as illustrated in a step 606. Alternatively, the trap-detection process could be stalled for a predetermined time before resuming. In either case, stalling the trap-detection process if a ranging process is in progress helps mitigate against potential disruptions to the data and/or voice services which may be caused by listening to one or more cable-television frequency bands (e.g., channels).

If, in step 604, it is determined that a ranging process is not in progress, or after step 606, trap-detection module 530 determines whether a telephone coupled to cable modem 210 is in use as indicated in a step 608. If a telephone is in use, then the trap-detection process is stalled until no telephone coupled to cable modem 210 is in use, as indicated in a step 610. Alternatively, the trap-detection process can be stalled for a predetermined time period before resuming if it is determined in step 608 that a telephone is in use. In either case, stalling the trap-detection process if a telephone is in use helps mitigate against potential disruptions to telephone services (e.g., a customer's telephone conversation) which may be caused by listening to one or more cable-television frequency bands (e.g., channels).

If, in step 608, it is determined that a telephone is not in use, or after step 610, trap-detection module 530 determines whether a data connection is in progress, as indicated in a step 612. If a data connection is in progress, then the trap-detection process is stalled until the data connection terminates, as indicated in a step 614. Alternatively, the trap-detection process can be stalled for a predetermined time period before resuming if it is determined in step 612 that a data connection is in progress. In either case, stalling the trap-detection process if a data connection is in progress helps mitigate against potential disruptions to data services (e.g., a customer's Internet experience) which may be caused by listening to one or more cable-television frequency bands (e.g., channels).

If, in step 612, it is determined that a data connection is not in progress, or after step 614, then trap-detection module 530 attempts to detect a video signal at a particular cable-television frequency band (e.g., channel) as indicated in a step 616. For digital cable signals, trap-detection module 530 may, for example, attempt to lock onto a QAM signal. Trap-detection module 530 may also, for example, attempt to detect energy associated with a carrier of the QAM signal.

If in step 618 a video signal is detected, and if the signal is a QAM signal, then the trap-detection process optionally determines whether the video signal originated from the cable head-end, as indicated in a step 620. For example, trap-detection module 530 may determine whether a target PID is present to determine that the video signal originated from the cable head-end. Whether trap-detection module 530 confirms that the video signal originated from cable head-end 110 or not, trap-detection object 542 is updated to indicate that a cable trap is not properly installed between cable modem 210 and cable head-end 110, as indicated in a step 622. For example, trap-detection object 542 may store a first piece of data (e.g., a logical 1), indicating that a cable trap is not properly installed to block the particular cable-television frequency band (e.g., channel).

If, on the other hand, a video signal is not detected in step 618, then trap-detection object 542 is updated to indicate that a cable trap is properly installed between cable modem 210 and cable head-end 110, as indicated in a step 624. For example, trap-detection object 542 may store a second piece of data (e.g., a logical 0), indicating that a cable trap is properly installed to block the particular cable-television frequency band (e.g., channel).

Although the steps of the trap-detection process of the embodiment of FIG. 6 are presented in a particular order, it is to be appreciated that this is for illustrative purposes only, and not limitation. For example, steps 604, 608, and 612 need not be performed in the order illustrated in FIG. 6, but may be performed in any permutation of orders as would be apparent to a person skilled in the relevant art(s). As a specific example, the trap-detection process of the method illustrated in FIG. 6 may be stalled any time it is determined that a ranging process is in progress, a telephone is being used, and/or a data connection is in progress.

VI. Conclusion

Described above are systems, apparatuses, and methods for automatic detection of a cable trap and applications thereof. It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A computer-implemented method for automatic trap-presence validation, comprising:
    creating a trap-detection object in a management information base of a cable modem, wherein the trap-detection object is configured to maintain data corresponding to whether a cable trap is present between a cable head-end and the cable modem;
    determining whether a video signal is present once a stalling operation is complete;
    updating the data to indicate whether the video signal is present; and
    transmitting the data from the trap-detection object to the cable head-end to determine whether the cable trap is present between the cable head-end and the cable modem.

2. The computer-implemented method of claim 1, wherein the stalling operation comprises determining that the cable modem is executing a ranging process.

3. The computer-implemented method of claim 1, wherein the stalling operation comprises determining that a telephone coupled to the cable modem is being used.

4. The computer-implemented method of claim 1, wherein the stalling operation comprises determining that a data connection at the cable modem is in progress.

5. The computer-implemented method of claim 1, wherein the stalling operation is complete after a predetermined amount of time.

6. The computer-implemented method of claim 1, further comprising initiating the trap-presence validation periodically.

7. The computer-implemented method of claim 1, further comprising determining if the video signal is a QAM signal.

8. The computer-implemented method of claim 7, further comprising determining whether the video signal originated from the cable head-end.

9. A cable modem for automatic trap-presence validation, comprising:
    a memory configured to store data corresponding to whether a cable trap is present between a cable head-end and the cable modem to be used to determine whether the cable trap is present between the cable head-end and the cable modem; and
    a central processing unit (CPU) responsive to a stalling operation, configured to determine whether a video signal is present once the stalling operation is complete, update the data in the memory to indicate whether the video signal is present, and transmit the data to the cable head-end.

10. The cable modem of claim 9, wherein the stalling operation comprises determining that the cable modem is executing a ranging process.

11. The cable modem of claim 9, wherein the stalling operation comprises determining that a telephone coupled to the cable modem is being used.

12. The cable modem of claim 9, wherein the stalling operation comprises determining that a data connection at the cable modem is in progress.

13. The cable modem of claim 9, wherein the stalling operation stalls the determining whether a video signal is present for a predetermined amount of time.

14. The cable modem of claim 9, wherein the CPU initiates the determining periodically.

15. The cable modem of claim 9, wherein the CPU is further configured to determine if the video signal is a QAM signal, and if so determine whether the video signal originated from the cable head-end.

16. A method, implemented in a cable modem, for automatic trap-presence validation, comprising:
    creating a trap-detection object in a management information base for determining whether a cable trap is present between a cable head-end and the cable modem, wherein the trap-detection object is configured to maintain data corresponding to whether the cable trap is present between the cable head-end and the cable modem;
    determining whether a video signal is present once a stalling operation is complete;
    updating the data to indicate whether the video signal is present; and
    transmitting the data from the trap-detection object to the cable head-end.

17. The method of claim 16, wherein the stalling operation comprises determining that the cable modem is executing a ranging process.

18. The method of claim 16, wherein the stalling operation comprises determining that a telephone coupled to the cable modem is being used.

19. The method of claim 16, wherein the stalling operation comprises determining that a data connection at the cable modem is in progress.

20. The method of claim 16, further comprising determining if the video signal is a QAM signal and if so determining whether the video signal originated from the cable head-end.

* * * * *